US012712120B2

(12) United States Patent
Mikoshiba et al.

(10) Patent No.: US 12,712,120 B2
(45) Date of Patent: Aug. 18, 2026

(54) TRANSFORMER

(71) Applicant: Hitachi Industrial Equipment Systems Co., Ltd., Tokyo (JP)

(72) Inventors: Ryousuke Mikoshiba, Tokyo (JP); Masaya Tanaka, Tokyo (JP); Makoto Shinohara, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 845 days.

(21) Appl. No.: 17/986,487

(22) Filed: Nov. 14, 2022

(65) Prior Publication Data

US 2023/0238172 A1 Jul. 27, 2023

(30) Foreign Application Priority Data

Jan. 21, 2022 (JP) ................................ 2022-008280

(51) Int. Cl.
*H01F 27/06* (2006.01)
*H01F 27/30* (2006.01)

(52) U.S. Cl.
CPC .................................. *H01F 27/306* (2013.01)

(58) Field of Classification Search
CPC ...................................................... H01F 27/306
USPC ...................................... 336/65–67, 210–212
See application file for complete search history.

(56) References Cited

U.S. PATENT DOCUMENTS 5,289,153 A * 2/1994 Gross .................... H01F 27/266 336/210
5,396,210 A 3/1995 Purohit et al.
9,105,393 B2 * 8/2015 Takahashi ............... H01F 27/08
9,514,877 B2 * 12/2016 Homma .............. H01F 41/0226
2002/0057180 A1 * 5/2002 Shirahata ................ H01F 30/12 336/213

(Continued)

FOREIGN PATENT DOCUMENTS

JP 2011-138931 A 7/2011
JP 2019-36567 A 3/2019

(Continued)

OTHER PUBLICATIONS

Japanese-language Office Action issued in Japanese Application No. 2022-008280 dated Oct. 22, 2024 with English translation (8 pages).

(Continued)

*Primary Examiner* — Ronald Hinson
(74) *Attorney, Agent, or Firm* — Crowell & Moring LLP

(57) ABSTRACT

There is provided a transformer (101) in which deformation of a coil (403, 503, 603) caused by a short-circuit electromagnetic mechanical force can be suppressed by using a coil pressing metal fitting (303, 401, 501, 601) that saves space and that is lightweight.

A coil pressing metal fitting (303, 401, 501, 601) includes a coil pressing metal fitting base member (201, 301) that comes into contact with a coil (403, 503, 603), and a reinforcement member (302) disposed outside the coil pressing metal fitting base member (201, 301). The reinforcement member (302) is connected and fixed to the coil pressing metal fitting base member (201, 301) by a joining member from inside the coil pressing metal fitting base member (201, 301) through the hole (202, 204) of the coil pressing metal fitting base member (201, 301).

7 Claims, 8 Drawing Sheets

(56) References Cited

U.S. PATENT DOCUMENTS

2002/0105404 A1* 8/2002 Biggie .................... H01F 27/06
336/67

FOREIGN PATENT DOCUMENTS

WO WO 2008/152710 A1 8/2010
WO WO 2014/132450 A1 2/2017

OTHER PUBLICATIONS

Hindi-language Examination Report issued in Indian Application No. 202214067110 dated Mar. 2, 2026, with English translation (8 pages).
Kulkarni, S.V., et al., "Transformer Engineering: Design and Practice", May 24, 2004, pp. 1-468, (478 pages).
Carrander, C., "Magnetizing Currents in Power Transformers—Measurements, Simulations, and Diagnostic Methods", KTH Electical Engineering, Aug. 31, 2017, pp. 1-183, (199 pages).

* cited by examiner

TRANSFORMER

BACKGROUND OF THE INVENTION

1. Field of the Invention

The present invention relates to a transformer.

2. Description of the Related Art

An internal structure of an amorphous transformer is a box-shaped structure in which a coil pressing metal fitting that sandwiches a coil from an outside, and upper and lower tightening metal fittings connected to the coil pressing metal fitting are provided, the coil being wound around an iron core leg made of an amorphous ribbon.

JP 2011-138931 A discloses a structure of an oil-immersed transformer in which strength of a coil pressing metal fitting is ensured and insulating oil is not retained by tightening metal fittings.

In order to reduce the size, an amorphous oil-immersed transformer may require tightening metal fittings capable of suppressing deformation of a coil caused by a high short-circuit electromagnetic mechanical force.

Particularly, since a mechanical force is directly transmitted to a coil pressing metal fitting that sandwiches the coil, the coil pressing metal fitting requires a structure having strength equal to or higher than the mechanical force.

However, when a stay (reinforcement member) is added and a plate thickness of the member is increased to improve the strength of the coil pressing metal fitting, external dimensions become large and the total mass increases.

SUMMARY OF THE INVENTION

An object of the present invention is to provide a transformer in which deformation of a coil caused by a short-circuit electromagnetic mechanical force can be suppressed by using a coil pressing metal fitting that saves space and that is lightweight.

A transformer according to one aspect of the present invention includes: a coil pressing metal fitting that sandwiches a coil from an outside, the coil being wound around an iron core leg made of an amorphous ribbon. The coil pressing metal fitting includes a coil pressing metal fitting base member that comes into contact with the coil, and a reinforcement member disposed outside the coil pressing metal fitting base member. The coil pressing metal fitting base member has a hole at a predetermined location. The reinforcement member is connected and fixed to the coil pressing metal fitting base member by a joining member from inside the coil pressing metal fitting base member through the hole of the coil pressing metal fitting base member.

According to one aspect of the present invention, deformation of the coil caused by a short-circuit electromagnetic mechanical force can be suppressed by using the coil pressing metal fitting that saves space and that is lightweight.

DETAILED DESCRIPTION OF THE PREFERRED EMBODIMENTS

First, an internal structure of a related transformer will be described with reference to FIG. 9.

Figure 9:
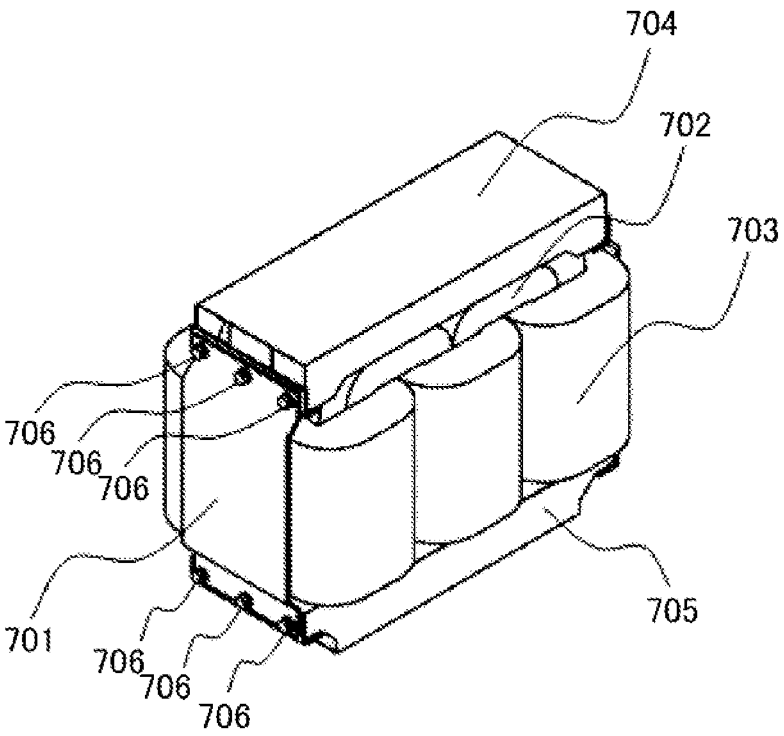
FIG. 9 is a schematic explanatory view showing an internal structure of a related transformer.

As shown in FIG. 9, an internal structure of an amorphous oil-immersed transformer is a box-shaped structure in which a coil pressing metal fitting 701 that sandwiches a coil 703 from the outside and an upper tightening metal fitting 704 and a lower tightening metal fitting 705 are connected to each other using connecting bolts 706, the coil 703 being wound around an iron core leg 702 made of an amorphous ribbon.

However, in order to reduce the size, the related amorphous oil-immersed transformer may require tightening metal fittings capable of suppressing deformation of the coil caused by a high short-circuit electromagnetic mechanical force.

Particularly, since a mechanical force is directly transmitted to the coil pressing metal fitting 701 that sandwiches the coil 703, the coil pressing metal fitting 701 requires a structure having strength equal to or higher than the mechanical force.

However, when a stay (reinforcement member) is added and a plate thickness of the member is increased to improve the strength of the coil pressing metal fitting 710, external dimensions become large and the total mass increases.

In an embodiment of the present invention, there is provided a transformer in which deformation of a coil caused by a short-circuit electromagnetic mechanical force can be suppressed by using a coil pressing metal fitting that saves space and that is lightweight.

Hereinafter, embodiments of the present invention will be described with reference to the drawings.

First Embodiment

An amorphous transformer of a first embodiment will be described with reference to FIGS. 1 to 6.

Figure 1:
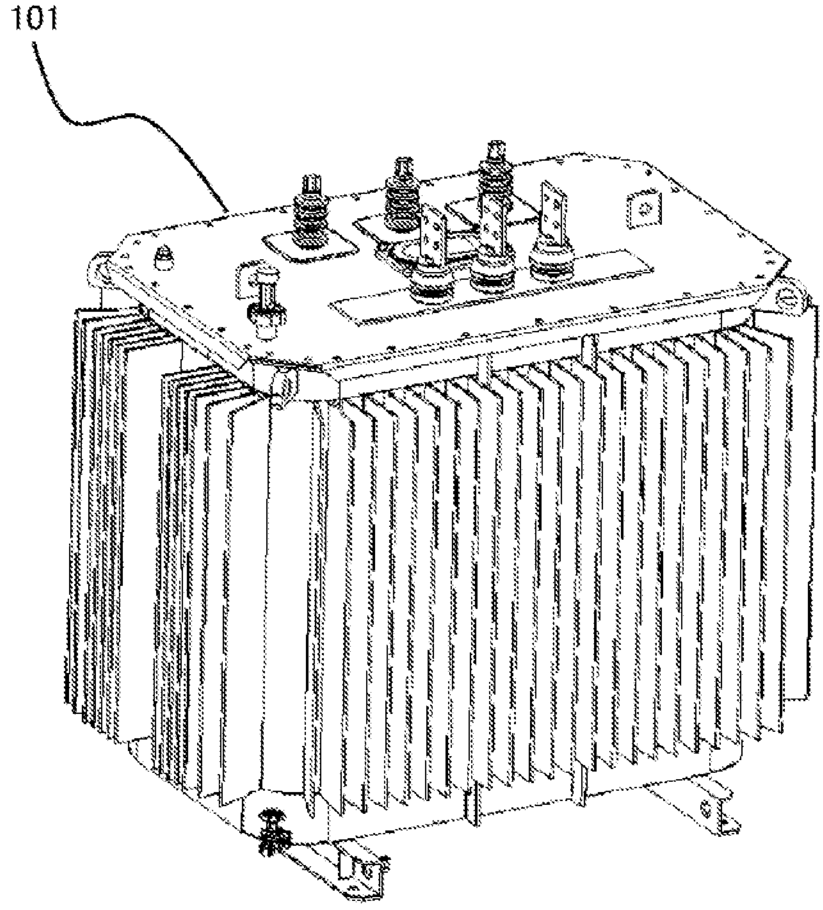
FIG. 1 is a schematic explanatory view showing an appearance of an amorphous transformer of a first embodiment.

FIG. 1 shows an appearance of an amorphous transformer 101.

Figure 6:
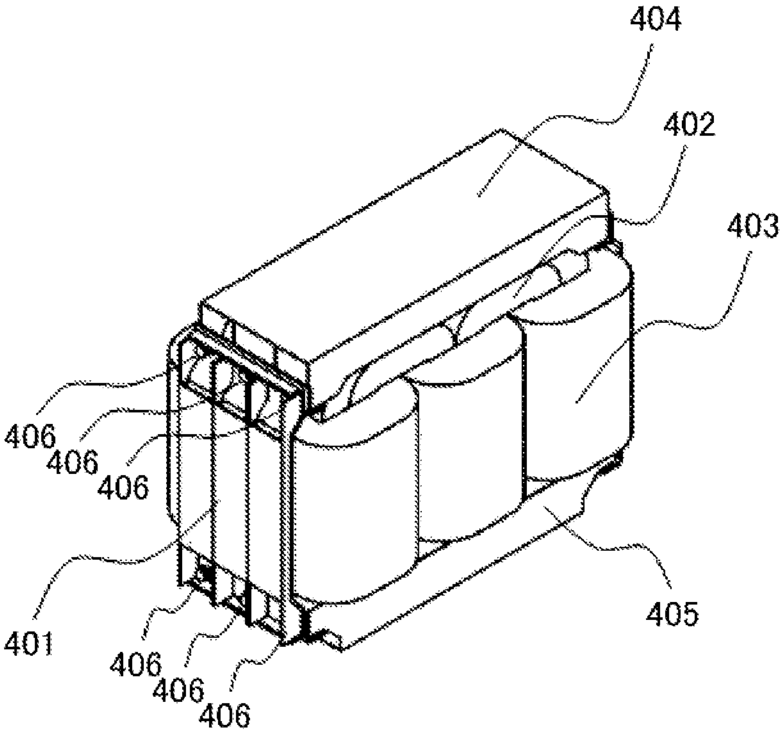
FIG. 6 is a schematic explanatory view showing an internal structure of the amorphous transformer in which the coil pressing metal fitting of the first embodiment is disposed.

As shown in FIG. 6, an internal structure of the amorphous oil-immersed transformer 101 is a box-shaped structure in which a coil pressing metal fitting 401 that sandwiches a coil 403 from the outside and an upper tightening metal fitting 404 and a lower tightening metal fitting 405 are connected to each other using connecting bolts 406, the coil 403 being wound around an iron core leg 402 made of an amorphous ribbon.

Figure 2:
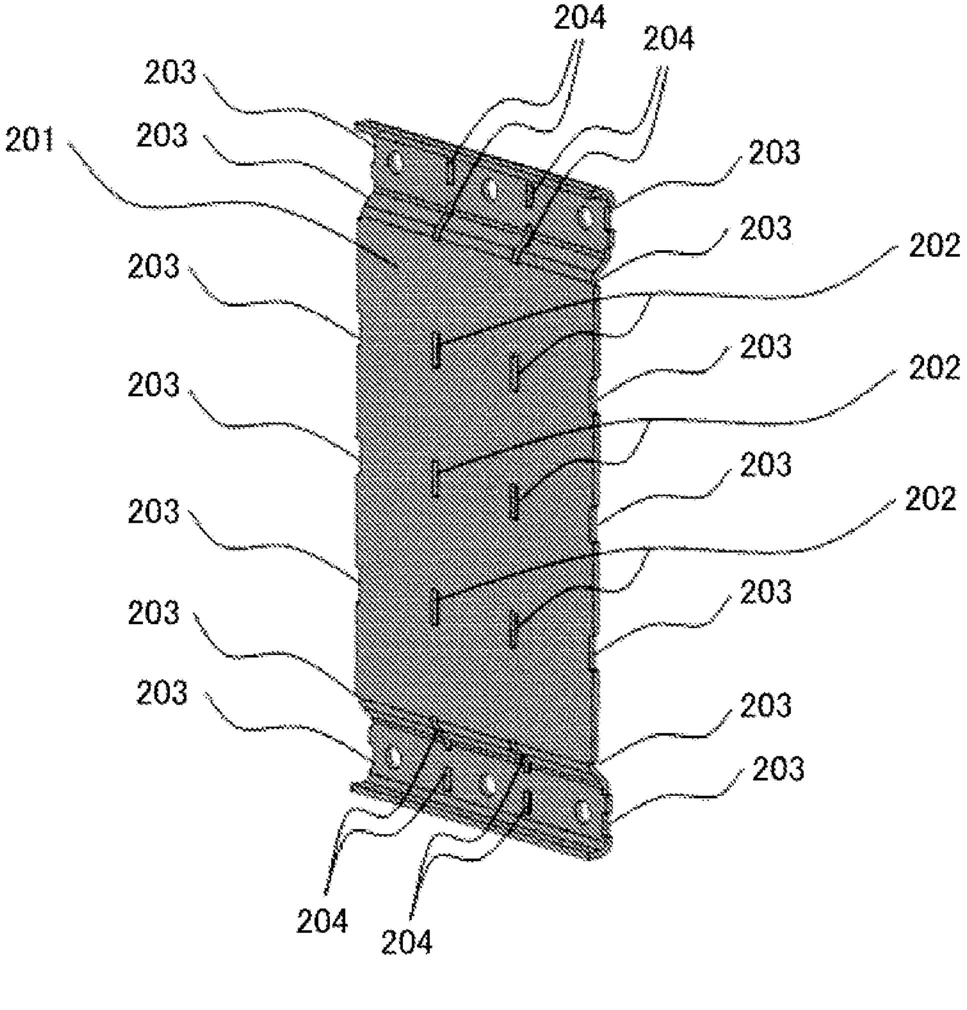
FIG. 2 is a schematic explanatory view showing a structure of a coil pressing metal fitting of the first embodiment.
Figure 3:
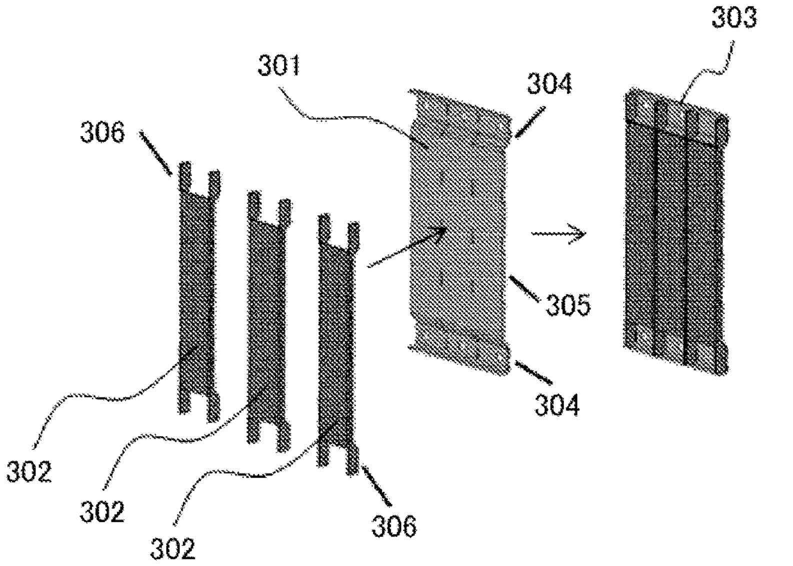
FIG. 3 is a schematic explanatory view showing a structure of the coil pressing metal fitting of the first embodiment.

As shown in FIGS. 2 and 3, the coil pressing metal fitting 401 includes coil pressing metal fitting base members 201 and 301 that come into contact with the coil 403, and a reinforcement member (stay) 302 disposed outside the coil pressing metal fitting base members 201 and 301. The coil pressing metal fitting base members 201 and 301 have holes 202 and 204 at predetermined locations.

The reinforcement member 302 is connected and fixed to the coil pressing metal fitting base members 201 and 301 by a joining member (not shown) from inside the coil pressing metal fitting base members 201 and 301 (coil side) through the holes 202 and 204 of the coil pressing metal fitting base members 201 and 301.

As shown in FIG. 3, the coil pressing metal fitting base member 301 includes stepped portions 304 provided at a top and a bottom of the coil pressing metal fitting base member 301, and a flat portion 305 provided between the stepped portions 304 at the top and the bottom.

As shown in FIGS. 2 and 3, the holes 202 provided in the coil pressing metal fitting base members 201 and 301 are connection holes provided in the flat portion 305. On the other hand, the holes 204 provided in the coil pressing metal fitting base members 201 and 301 are positioning holes provided in the stepped portions 304. The reinforcement member 302 includes engaging portions 306 provided at a top and a bottom of the reinforcement member 302.

Figure 4:
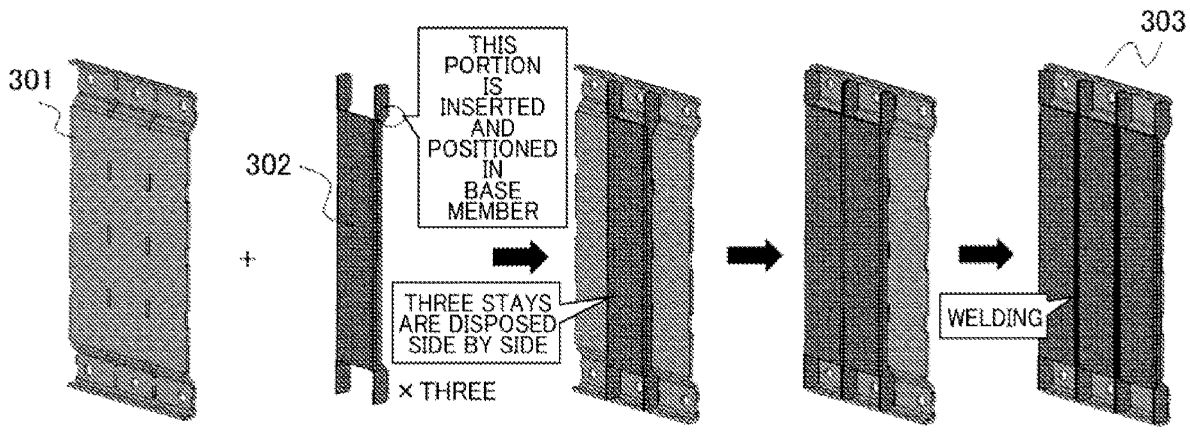
FIG. 4 is a schematic explanatory view showing a structure of the coil pressing metal fitting of the first embodiment.

With this configuration, as shown in FIGS. 2 to 4, the engaging portions 306 of the reinforcement member 302 are inserted and positioned in the respective stepped portions 304 of the coil pressing metal fitting base member 301 through the positioning holes 204. In a positioned state, the connection holes 202 of the coil pressing metal fitting base member 301 are connected by a connecting member from inside the coil pressing metal fitting base member 301.

In addition, the coil pressing metal fitting base member 301 includes connection cutout portions 203. The reinforcement member 302 is fixed to the coil pressing metal fitting base member 301 through the connection cutout portions 203. Incidentally, the reinforcement member 302 has a U-shape.

As shown in FIGS. 2 to 4, two or more reinforcement members 302 are each joined by a joining member (not shown) from inside the coil pressing metal fitting base member 301 (coil side) through the holes 202 and 204 of the coil pressing metal fitting base member 301.

For example, the reinforcement members 302 are plug-welded from inside the coil pressing metal fitting base member 301 through the holes 202 and 204 of the coil pressing metal fitting base member 301, so that the holes 202 and 204 are filled with the joining member. In such a manner, the reinforcement members 302 and the coil pressing metal fitting base member 301 are joined to each other. Here, the joining member is, for example, a conductive member, a welding material, or the like.

In addition, as shown in FIG. 4, among the two or more reinforcement members 302, the reinforcement members 302 adjacent to each other may be welded and connected to each other through a welding material. Here, the reinforcement members 302 adjacent to each other are connected to each other from the outside by line welding. Strength of a coil pressing metal fitting 303 can be further increased by performing line welding.

Figure 5:
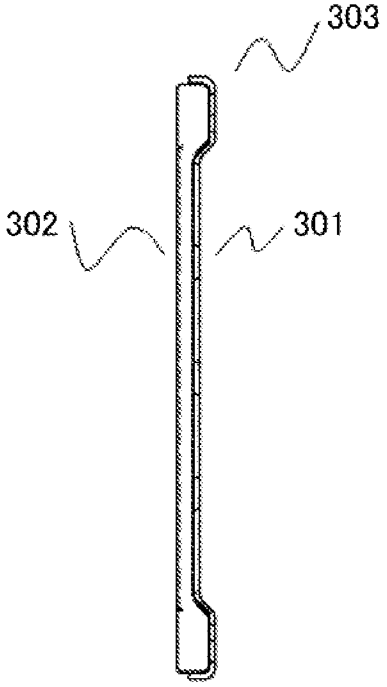
FIG. 5 is a cross-sectional view showing a structure of the coil pressing metal fitting of the first embodiment.

As shown in FIGS. 3 and 4, the reinforcement members 302 each have a U-shaped structure, the two or more reinforcement members 302 are disposed side by side on the coil pressing metal fitting base member 301, and the reinforcement members 302 are each connected by the coil pressing metal fitting base member 301 through the holes 202 and 204 and through the connection cutout portions 203. In such a manner, the two or more (three in FIG. 4) reinforcement members 302 are disposed side by side and fixed to the coil pressing metal fitting base member 301 to form the coil pressing metal fitting 303. FIG. 5 shows a cross-sectional structure of the coil pressing metal fitting 303 that is completed.

According to the first embodiment, deformation of the coil 403 caused by a short-circuit electromagnetic mechanical force can be suppressed by using the coil pressing metal fittings 401 and 303 that save space and that are lightweight.

In addition, each of the reinforcement members 302 disposed outside the coil pressing metal fitting base member 301 of the coil pressing metal fittings 401 and 303 has a U-shape. For this reason, a stack effect promotes circulation of insulating oil caused by a difference in temperature between the top and the bottom in a transformer tank, so that a cooling efficiency of the transformer can be improved and the size and weight of the transformer can be reduced.

Second Embodiment

An amorphous oil-immersed transformer of a second embodiment will be described with reference to FIG. 7.

Figure 7:
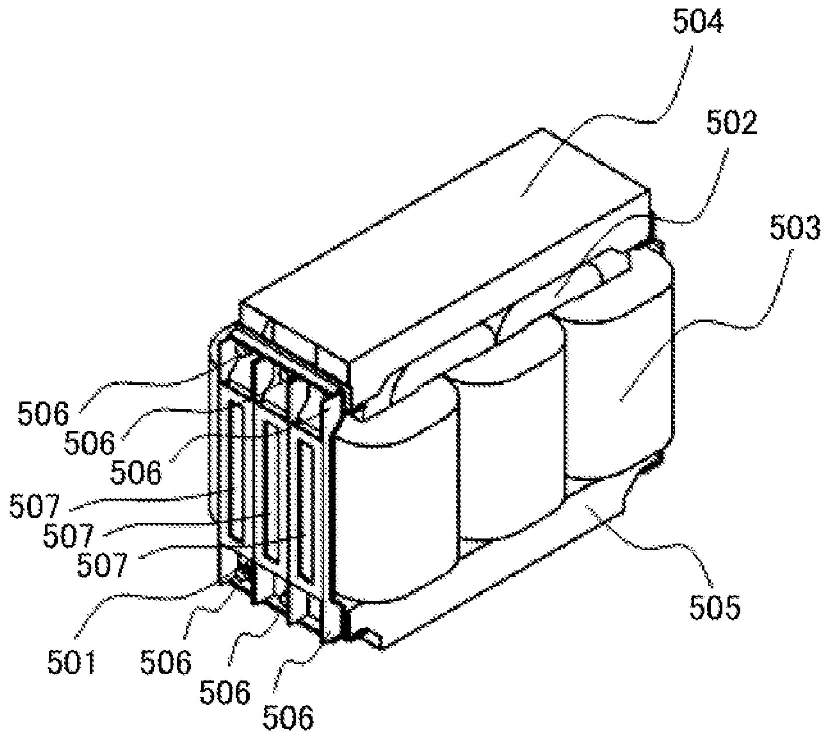
FIG. 7 is a schematic explanatory view showing an internal structure of an amorphous transformer in which a coil pressing metal fitting of a second embodiment including stays on which extruding is performed is disposed.

As shown in FIG. 7, the internal structure of the amorphous oil-immersed transformer 101 is a box-shaped structure in which a coil pressing metal fitting 501 that sandwiches a coil 503 from the outside and an upper tightening metal fitting 504 and a lower tightening metal fitting 505 are connected to each other using connecting bolts 506, the coil 503 being wound around an iron core leg 502 made of an amorphous ribbon.

As shown in FIGS. 2 and 3, the coil pressing metal fitting 501 includes the holes 202 and 204 and the connection cutout portions 203 in the coil pressing metal fitting base members 201 and 301. The structure is such that two or more reinforcement members (stays) 302 each having a U-shaped structure are disposed side by side on the coil pressing metal fitting base member 301 and the reinforcement members are joined by a joining member (not shown) from inside the coil pressing metal fitting base members 201 and 301 through the holes 202 and 204 and through the connection cutout portions 203. Since other specific configurations and the like are the same as those of the amorphous oil-immersed transformer of the first embodiment, a description thereof will not be repeated.

The amorphous oil-immersed transformer of the second embodiment differs from the amorphous oil-immersed transformer of the first embodiment in that the reinforcement member (stay) 302 includes an uneven portion 507 on a surface thereof. The uneven portion 507 is formed by extruding the reinforcement member 302 through press working.

According to the second embodiment, deformation of the coil 503 caused by a short-circuit electromagnetic mechanical force can be suppressed by using the coil pressing metal fitting 501 that saves space and that is lightweight. Further, strength of the coil pressing metal fitting 501 can be further increased by providing the uneven portion 507 on the surface of the reinforcement member 302.

Third Embodiment

An amorphous oil-immersed transformer of a third embodiment will be described with reference to FIG. 8.

Figure 8:
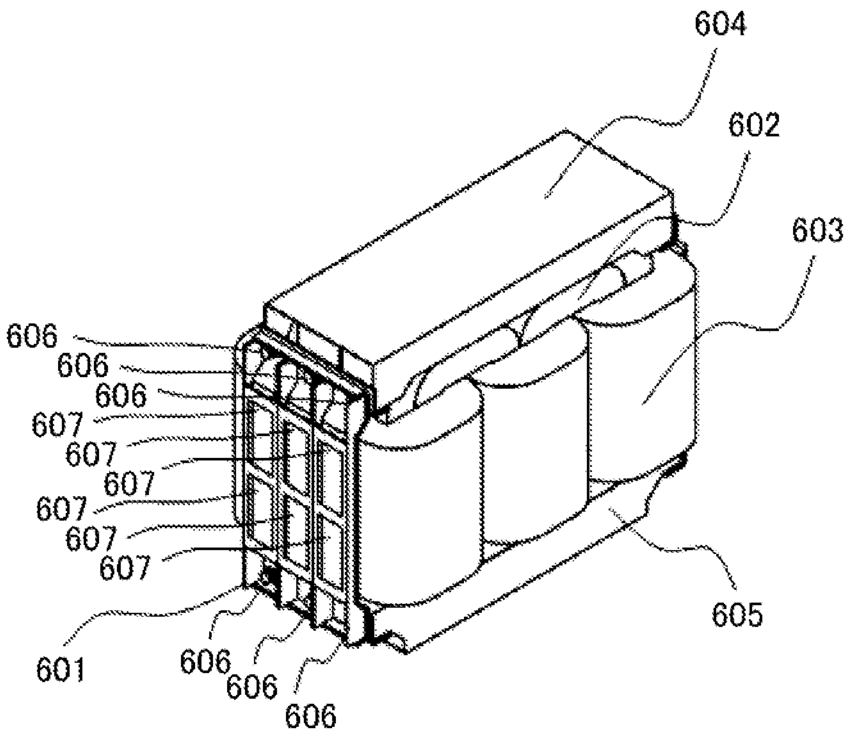
FIG. 8 is a schematic explanatory view showing an internal structure of an amorphous transformer in which a coil pressing metal fitting of a third embodiment including stays on which cutout is performed is disposed.

As shown in FIG. 8, the internal structure of the amorphous oil-immersed transformer 101 is a box-shaped structure in which a coil pressing metal fitting 601 that sandwiches a coil 603 from the outside and an upper tightening metal fitting 604 and a lower tightening metal fitting 605 are connected to each other using connecting bolts 606, the coil 603 being wound around an iron core leg 602 made of an amorphous ribbon.

As shown in FIGS. 2 and 3, the coil pressing metal fitting 601 includes the holes 202 and 204 and the connection cutout portions 203 in the coil pressing metal fitting base members 201 and 301. The structure is such that two or more reinforcement members (stays) 302 each having a U-shaped structure are disposed side by side on the coil pressing metal fitting base member 301 and the reinforcement members are joined by a joining member (not shown) from inside the coil pressing metal fitting base members 201 and 301 through the holes 202 and 204 and through the connection cutout portions 203. Since other specific configurations and the like are the same as those of the amorphous oil-immersed transformer of the first embodiment, a description thereof will not be repeated.

The amorphous oil-immersed transformer of the third embodiment differs from the amorphous oil-immersed transformer of the first embodiment in that the reinforcement member (stay) 302 includes a plurality of cutout portions (through-holes) 607 in a surface thereof. The cutout portion 607 is formed by performing cutout on the reinforcement member 302 through press working.

According to the third embodiment, deformation of the coil 603 caused by a short-circuit electromagnetic mechanical force can be suppressed by using the coil pressing metal fitting 601 that saves space and that is lightweight. Further, since the plurality of cutout portions 607 are provided in the surface of the reinforcement member 302, it is possible to reduce the weight of the coil pressing metal fitting 601 while maintaining strength of the coil pressing metal fitting 601 at a constant strength.

The embodiment is an oil-immersed transformer including a coil pressing metal fitting that sandwiches a coil from an outside, the coil being wound around an iron core leg made of an amorphous ribbon, and having a structure in which the coil pressing metal fitting includes a coil pressing metal fitting base member that comes into contact with the coil and a reinforcement member (stay) disposed outside the coil pressing metal fitting base member, and having a structure in which the reinforcement member (stay) is connected from an inside through a hole of the coil pressing metal fitting base member, so that filling of the hole is done.

According to the embodiment, deformation of the coil caused by a short-circuit electromagnetic mechanical force can be suppressed by using the coil pressing metal fitting that saves space and that is lightweight.

Incidentally, the present invention is not limited to the above-described embodiments, and includes various modification examples. For example, the above embodiments have been described in detail to facilitate understanding of the present invention, and the present invention is not necessarily limited to including all the described configurations. In addition, a part of a configuration of an embodiment can be replaced with a configuration of another embodiment, and a configuration of another embodiment can also be added to a configuration of an embodiment. In addition, another configuration or material can be added to, removed from, or replaced with a part of a configuration of each embodiment.

What is claimed is:

1. A transformer (101) comprising:
a coil pressing metal fitting (303, 401, 501, 601) that presses against a coil (403, 503, 603) from an outside, the coil (403, 503, 603) being wound around an iron core leg (402, 502, 602) made of an amorphous ribbon,
wherein the coil pressing metal fitting (303, 401, 501, 601) includes a coil pressing metal fitting base member (201, 301) that comes into contact with the coil (403, 503, 603), and a reinforcement member (302) disposed outside the coil pressing metal fitting base member (201, 301),
the coil pressing metal fitting base member (201, 301) has a hole (202, 204) at a predetermined location,
the reinforcement member (302) is connected and fixed to the coil pressing metal fitting base member (201, 301) by a joining member from inside the coil pressing metal fitting base member (201, 301) through the hole (202, 204) of the coil pressing metal fitting base member (201, 301),
wherein the coil pressing metal fitting base member (201, 301) includes stepped portions (304) provided at a top and a bottom of the coil pressing metal fitting base member (201, 301), and a flat portion (305) provided between the stepped portions (304) at the top and the bottom,
the hole (202, 204) of the coil pressing metal fitting base member (201, 301) includes positioning holes (204) provided in the stepped portions (304) and a connection hole (202) provided in the flat portion (305),
the reinforcement member (302) includes engaging portions (306) provided at a top and a bottom of the reinforcement member (302), and
in a state where the engaging portions (306) of the reinforcement member (302) are inserted and positioned in the respective stepped portions (304) of the coil pressing metal fitting base member (201, 301) through the positioning holes (204), the connection hole (202) of the coil pressing metal fitting base member (201, 301) is connected by a connecting member from inside the coil pressing metal fitting base member (201, 301).

2. The transformer (101) according to claim 1,
wherein the reinforcement member (302) has a U-shape.

3. The transformer (101) according to claim 1,
wherein two or more reinforcement members (302) are each connected by the joining member from inside the coil pressing metal fitting base member (201, 301) through the hole (202, 204) of the coil pressing metal fitting base member (201, 301), so that the two or more reinforcement members (302) are disposed side by side and fixed to the coil pressing metal fitting base member (201, 301).

4. The transformer (101) according to claim 3,
wherein among the two or more reinforcement members (302), the reinforcement members (302) adjacent to each other are connected to each other by a welding material.

5. The transformer (101) according to claim 1,
wherein the reinforcement member (302) includes an uneven portion (507) on a surface of the reinforcement member (302).

6. The transformer (101) according to claim 1,
wherein the reinforcement member (302) includes a plurality of cutout portions (607) in a surface of the reinforcement member (302).

7. A transformer (101) comprising:

a coil pressing metal fitting (303, 401, 501, 601) that presses against a coil (403, 503, 603) from an outside, the coil (403, 503, 603) being wound around an iron core leg (402, 502, 602) made of an amorphous ribbon, wherein the coil pressing metal fitting (303, 401, 501, 601) includes a coil pressing metal fitting base member (201, 301) that comes into contact with the coil (403, 503, 603), and a reinforcement member (302) disposed outside the coil pressing metal fitting base member (201, 301), the coil pressing metal fitting base member (201, 301) has a hole (202, 204) at a predetermined location, the reinforcement member (302) is connected and fixed to the coil pressing metal fitting base member (201, 301) by a joining member from inside the coil pressing metal fitting base member (201, 301) through the hole (202, 204) of the coil pressing metal fitting base member (201, 301), and wherein the coil pressing metal fitting base member (201, 301) further includes a connection cutout portion (203), and the reinforcement member (302) is fixed to the coil pressing metal fitting base member (201, 301) through the connection cutout portion (203).

* * * * *